M. O. DOLSON.
SPRING PROTECTOR FOR TROLLEY RETRIEVERS AND CATCHERS.
APPLICATION FILED NOV. 19, 1913.
1,127,206. Patented Feb. 2, 1915.
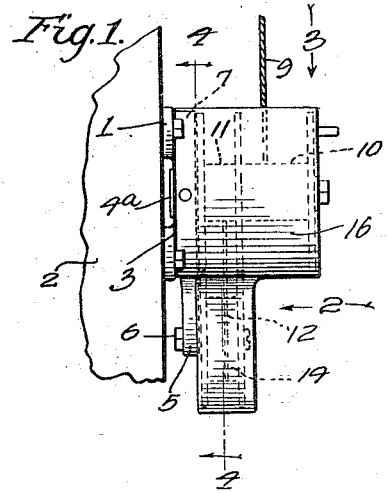
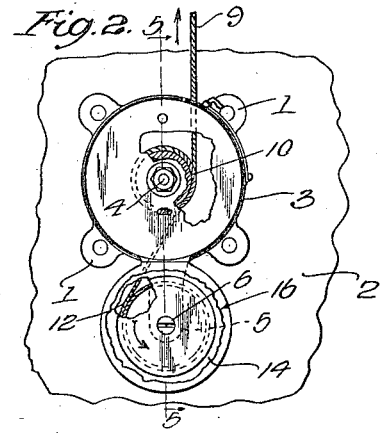
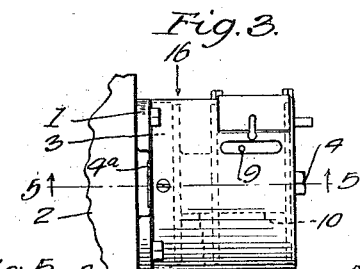
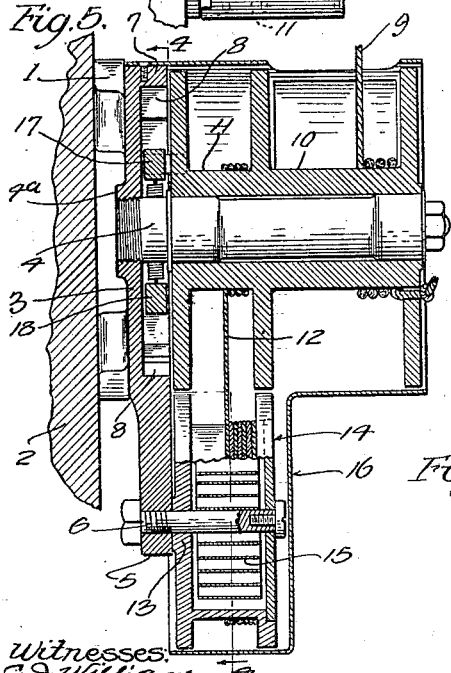
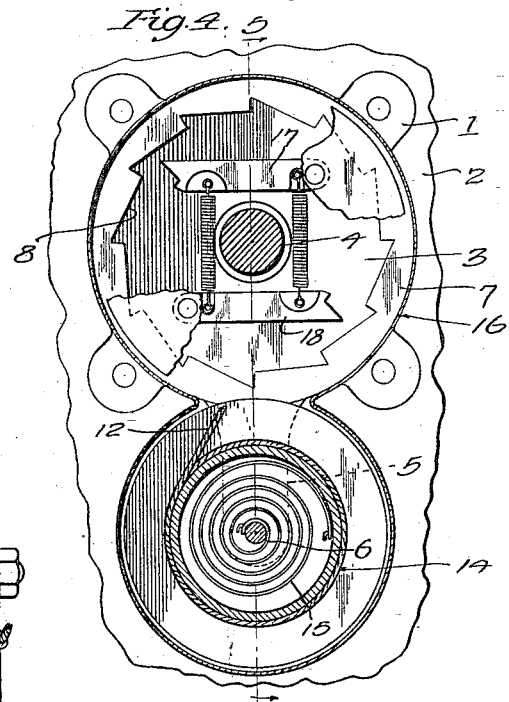
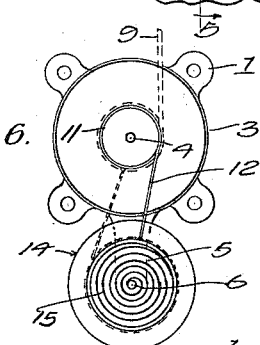
Witnesses:
C. J. Williams.
A. Adams.
Inventor
Martin O. Dolson
by Semer G. Wells,
Attorney.

UNITED STATES PATENT OFFICE.

MARTIN O. DOLSON, OF LOS ANGELES, CALIFORNIA.

SPRING-PROTECTOR FOR TROLLEY RETRIEVERS AND CATCHERS.

1,127,206.

Specification of Letters Patent.

Patented Feb. 2, 1915.

Application filed November 19, 1913. Serial No. 801,826.

*To all whom it may concern:*

Be it known that I, MARTIN O. DOLSON, a citizen of the United States, residing at Los Angeles, county of Los Angeles, State of California, have invented a new and useful Spring-Protector for Trolley Retrievers and Catchers, of which the following is a specification.

My object is to connect a winding spring to the winding drum of a trolley rope in such a manner that when the trolley rope breaks, the spring will only unwind to a limited extent and will not snap or unhook, and so that the spring will be wound up when the winding drum turns in either direction.

My invention consists of the combination with the winding drum of a trolley rope of a second winding drum fixed to the first winding drum, a stub shaft mounted parallel with the second winding drum, a spring casing rotatably mounted upon the stub shaft, a winding spring connecting the spring casing to the stub shaft, a third winding drum upon the spring casing, a cord connected to and winding upon the third winding drum and connected to and adapted to be wound upon the second winding drum, so that if the trolley runs off the wire and the pole rises, the winding spring will unwind until all of the cord is wound upon the third winding drum and the second winding drum is brought to the starting point and continued operation of the second winding drum in its unwinding direction will unwind the cord from the third winding drum and wind up the spring, and so that the winding spring is wound up when the second winding drum moves either way from the starting point; and my invention consists further of the novel features herein shown, described and claimed.

The principles of my present invention may be applied both to trolley pole retrievers and to trolley pole catchers and is especially applicable to trolley pole retrievers such as shown in my former Patent No. 1,049,292, dated Dec. 31, 1912, entitled trolley pole governors, and while I have shown in the present patent a trolley pole catcher, it is to be understood that the same principles may be applied to the construction shown in my former patent.

In the drawings: Figure 1 is a side elevation of a trolley catcher embodying the principles of my invention, the car body being broken away, and looking in the direction indicated by the arrow 1 in Fig. 2. Fig. 2 is a rear elevation, partly in section, as indicated by the arrow 2 in Fig. 1. Fig. 3 is a top plan as indicated by the arrow 3 in Fig. 1. Fig. 4 is an enlarged cross sectional detail on a plane parallel with Fig. 2 and on the lines 4—4 in Figs. 1 and 5. Fig. 5 is an enlarged vertical longitudinal sectional detail on the lines 5—5 of Figs. 3 and 4, and on a plane parallel with Fig. 1. Fig. 6 is a diagrammatic view illustrating the winding of the trolley rope, the winding spring and the connecting cord.

Referring to the drawing in detail, the supporting ears 1 are secured to the car body 2. The circular web 3 is supported by the ears 1 and has a hub $4^a$ at its center. The stub shaft 4 is fixed rigidly in the hub $4^a$. The arm 5 extends downwardly from the web 3 and the second stub shaft 6 is fixed rigidly in the arm 5 parallel with the first stub shaft. The annular flange 7 extends backwardly from the edge of the web 3 and the pawl retaining teeth 8 extend inwardly from the flange.

The trolley rope 9 is attached to and wound upon the trolley rope winding drum 10, said drum 10 being loosely mounted upon the stub shaft 4. The connecting cord winding drum 11 is fixed relative to the first winding drum and one end of the connecting cord 12 is attached to the second winding drum. The hub 13 is loosely mounted upon the second stub shaft 6 and carries the second connecting cord winding drum and spring casing 14. The other end of the connecting cord 12 is attached to this drum 14. The winding spring 15 connects the drum 14 to the stub shaft 6. A cap plate closes the spring casing. The housing 16 covers the drums. The centrifugal pawls 17 and 18 fly outwardly and engage the teeth 8 when the winding drums are rapidly rotated.

In assembling the connecting cord 12 is wound upon the drum 14, drawn to put the spring 15 under tension and then attached to the drum 11. Then parts are manipulated to wind the connecting cord 12 upon the drum 11 and then the trolley rope 9 is attached to the drum 10. The action of the spring will wind the trolley rope upon its drum until the connecting cord is all unwound from the drum 11 to the starting point. At this time the spring is still under tension and rotating the trolley rope drum in either direction will wind up the spring. As long as the connecting cord holds, the spring will be under tension and will not completely unwind or snap or unhook, no matter what happens to the trolley rope.

The centrifugal pawls 17 and 18 are operated by the action of the trolley rope drum to engage the teeth 8 and catch the trolley when it starts to fly upwardly.

I claim:

1. The combination with a trolley rope winding drum of a second winding drum operated by the first winding drum, a third winding drum and spring casing mounted upon a separate shaft, a spring in the spring casing, and a cord connecting the second and third winding drums so as to hold the spring under tension.

2. The combination with a trolley rope winding drum of a second winding drum fixed to the first winding drum, a stub shaft fixed parallel with the first winding drum, a third winding drum and spring casing upon the stub shaft, a spring connecting the spring casing to the stub shaft, and a cord wound upon the third winding drum and connected to the second winding drum, so as to hold the spring under tension.

3. The combination with a trolley rope winding drum of a second winding drum fixed to the first winding drum, a stub shaft fixed parallel with the first winding drum, a third winding drum and spring casing upon the stub shaft, a spring connecting the spring casing to the stub shaft, and a cord wound upon the third winding drum and connected to the second winding drum, so as to hold the spring under tension, pawl retaining teeth and centrifugal pawls operated by the action of the trolley rope winding drum to engage the pawl retaining teeth.

MARTIN O. DOLSON.

Witnesses:
CLARENCE J. WILLIAMS,
SEMER G. WELLS.

Copies of this patent may be obtained for five cents each, by addressing the "Commissioner of Patents, Washington, D. C."